US010822965B2

(12) United States Patent
MacMahon et al.

(10) Patent No.: US 10,822,965 B2
(45) Date of Patent: Nov. 3, 2020

(54) ACTIVE AIRFOIL VIBRATION CONTROL

(71) Applicant: General Electric Company, Schenectady, NY (US)

(72) Inventors: Carl L. MacMahon, Cincinnati, OH (US); Julie Ann Duselis, Cincinnati, OH (US); Drew Michael Capps, Avon, IN (US); Yoon Seok Choi, Cincinnati, OH (US); Mark Joseph Mielke, Blanchester, OH (US)

(73) Assignee: General Electric Company, Schenectady, NY (US)

( * ) Notice: Subject to any disclaimer, the term of this patent is extended or adjusted under 35 U.S.C. 154(b) by 258 days.

(21) Appl. No.: 15/935,186

(22) Filed: Mar. 26, 2018

(65) Prior Publication Data
US 2019/0292923 A1  Sep. 26, 2019

(51) Int. Cl.
 *F01D 5/26* (2006.01)
 *F01D 5/16* (2006.01)
(52) U.S. Cl.
 CPC .............. *F01D 5/26* (2013.01); *F01D 5/16* (2013.01); *F05D 2260/96* (2013.01)
(58) Field of Classification Search
 CPC ..................................... F01D 5/26; F01D 5/16
 See application file for complete search history.

(56) References Cited

U.S. PATENT DOCUMENTS

| | | | | |
|---|---|---|---|---|
| 4,856,962 A * | 8/1989 | McDow | ................ | F01D 17/162 415/115 |
| 5,709,527 A * | 1/1998 | Ernst | ......................... | F01D 5/26 415/10 |
| 6,032,552 A * | 3/2000 | Alleai | ....................... | F16F 7/10 248/562 |
| 6,827,551 B1 | 12/2004 | Duffy et al. | | |
| 7,086,831 B2 | 8/2006 | Harper | | |
| 8,387,959 B2 | 3/2013 | Kim | | |
| 9,334,740 B2 * | 5/2016 | Kellerer | .................... | F01D 5/16 |
| 2005/0129520 A1 * | 6/2005 | Harper | ...................... | F01D 5/26 416/204 R |
| 2016/0273517 A1 | 9/2016 | Betran Palomas et al. | | |
| 2017/0254208 A1 * | 9/2017 | Prince | ..................... | B29C 35/02 |
| 2018/0135635 A1 * | 5/2018 | Staroselsky | .............. | F02K 3/06 |

FOREIGN PATENT DOCUMENTS

CN        104965408        10/2015

OTHER PUBLICATIONS

Mr Fluid, Lord, 2020.*

* cited by examiner

*Primary Examiner* — Woody A Lee, Jr.
(74) *Attorney, Agent, or Firm* — General Electric; James Reed (57) ABSTRACT

An apparatus for an aircraft engine that is configured for actively adjusting physical characteristics of an airfoil. The apparatus includes an airfoil that has a body and a filler that is embedded within the body. A source for electromagnetic energy is positioned in a portion of the engine and configured to generate electromagnetic energy having a predetermined range which encompasses the airfoil. A physical property of the filler is configured to change between a first state in the absence of electromagnetic energy and a second state in the presence of electromagnetic energy. The airfoil has a first airfoil characteristic when the filler is in the first state and the airfoil has a second airfoil characteristic when the filler is in the second state.

25 Claims, 12 Drawing Sheets

ACTIVE AIRFOIL VIBRATION CONTROL

BACKGROUND OF THE INVENTION

The present invention relates generally to aircraft propulsion, and more specifically to aircraft engines incorporating airfoils having active vibration control.

A gas turbine engine includes several rotors each of which includes a rotating disk carrying an array of airfoils. It is common for aerodynamic loads on an airfoil to cause vibration. In this regard, the interaction between the airfoils and the air can cause a vibratory response. Where vibration amplitude is high enough, the airfoil and engine can be damaged.

Conventionally, known resonances are designed out of the operating range and/or blade thickness is increased to remove high stresses. One problem with this is that the blade is not efficient over a broad range of conditions. Another problem is that the blade might be heavier than otherwise required.

BRIEF DESCRIPTION OF THE INVENTION

These problems are addressed by an engine that includes components that can change physical characteristics such as natural harmonic frequencies when exposed to external stimuli such as magnetic fields.

An apparatus for an aircraft engine that is configured for actively adjusting physical characteristics of an airfoil. The apparatus includes an airfoil that has a body and a filler that is embedded within the body. A source for electromagnetic energy is positioned in a portion of the engine and configured to generate electromagnetic energy having a predetermined range which encompasses the airfoil. A physical property of the filler is configured to change between a first state in the absence of electromagnetic energy and a second state in the presence of electromagnetic energy. The airfoil has a first airfoil characteristic when the filler is in the first state and the airfoil has a second airfoil characteristic when the filler is in the second state.

According to another aspect of the technology described herein, a method for changing a physical characteristic of an aircraft engine component utilizing an outside stimuli. The method includes the steps of: generating an outside stimuli; exposing a filler that is a part of an aircraft engine component to the outside stimuli; causing a physical property of the filler to change.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
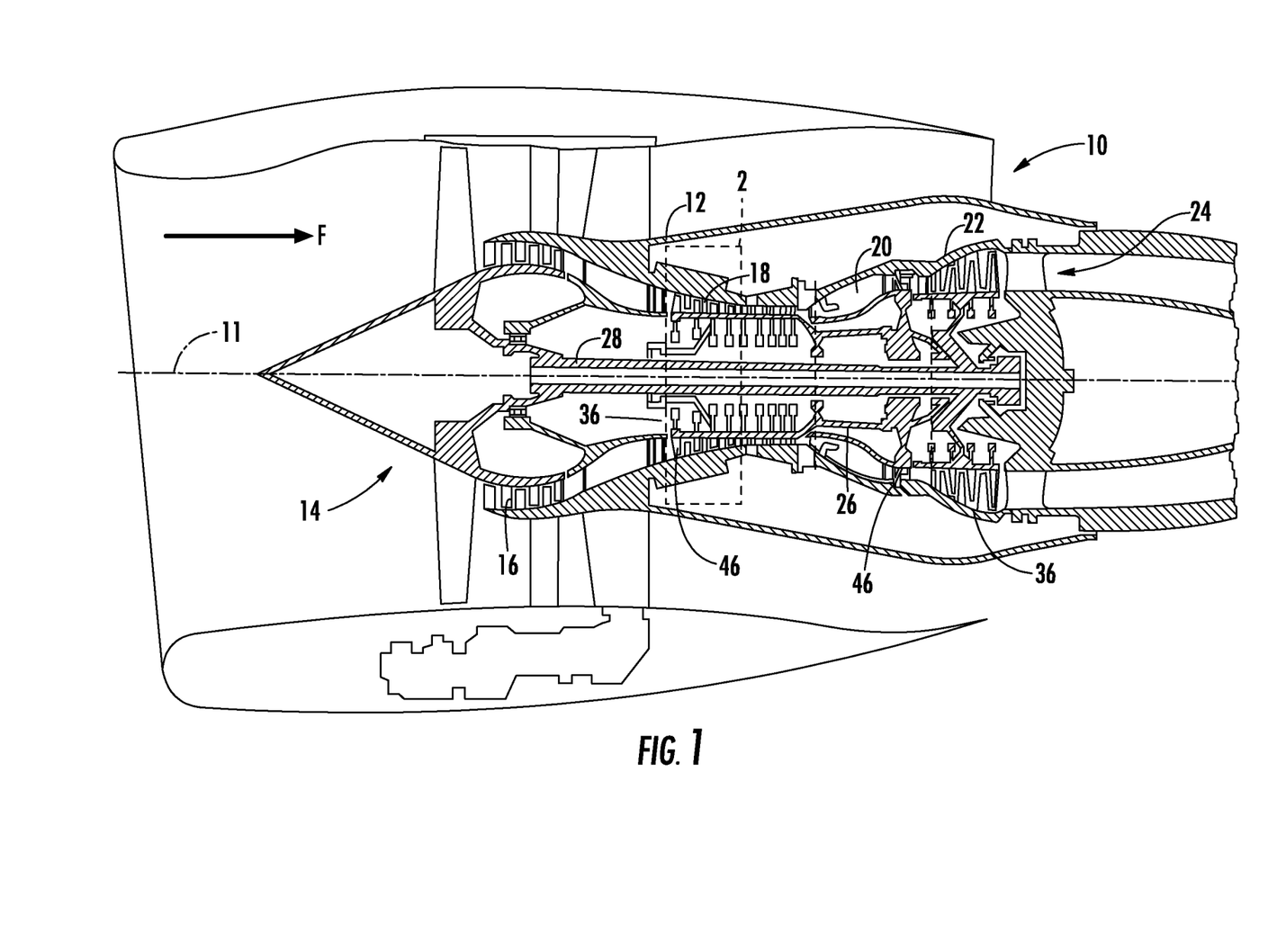
FIG. 1 is a cross-sectional schematic view of a gas turbine engine that incorporates an airfoil.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines. Such engines can be turbofans, turbojets, turboprops, etc., as well as engines used in land or water vehicles, stationary land-based gas turbine engines, or other types of turbomachinery such as steam turbines. The engine 10 includes at least one component such as an airfoil that can be actively reconfigured for vibration control. The component can be a rotating or non-rotating type. In this regard, a portion of the component is formed of a material capable of changing its physical properties in response to electromagnetic energy.

The engine 10 has a longitudinal center line or axis 11 and a stationary core casing 12 disposed concentrically about and coaxially along the axis 11. It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 14, a booster 16, a compressor 18, a combustor 20, a high pressure turbine or "HPT" 22, and a low pressure turbine or "LPT" 24 arranged in serial flow relationship. In operation, pressurized air from the compressor 18 is mixed with fuel in the combustor 20 and ignited, thereby generating combustion gases. Some work is extracted from these gases by the high pressure turbine 22 which drives the compressor 18 via an outer shaft 26. The combustion gases then flow into the low pressure turbine 24 which drives the fan 14 and booster 16 via an inner shaft 28.

The engine 10 includes a turbomachinery rotor 36 that is a representative of a rotatable component as that term is used herein. The concepts of the present invention will be described using the rotor 36 embodied in the compressor 18 as an example. It will be understood that those concepts are applicable to any rotor or rotor-like, stationary or nonstationary, component in a gas turbine engine, such as fan, booster, compressor or turbine rotors.

Figure 2:
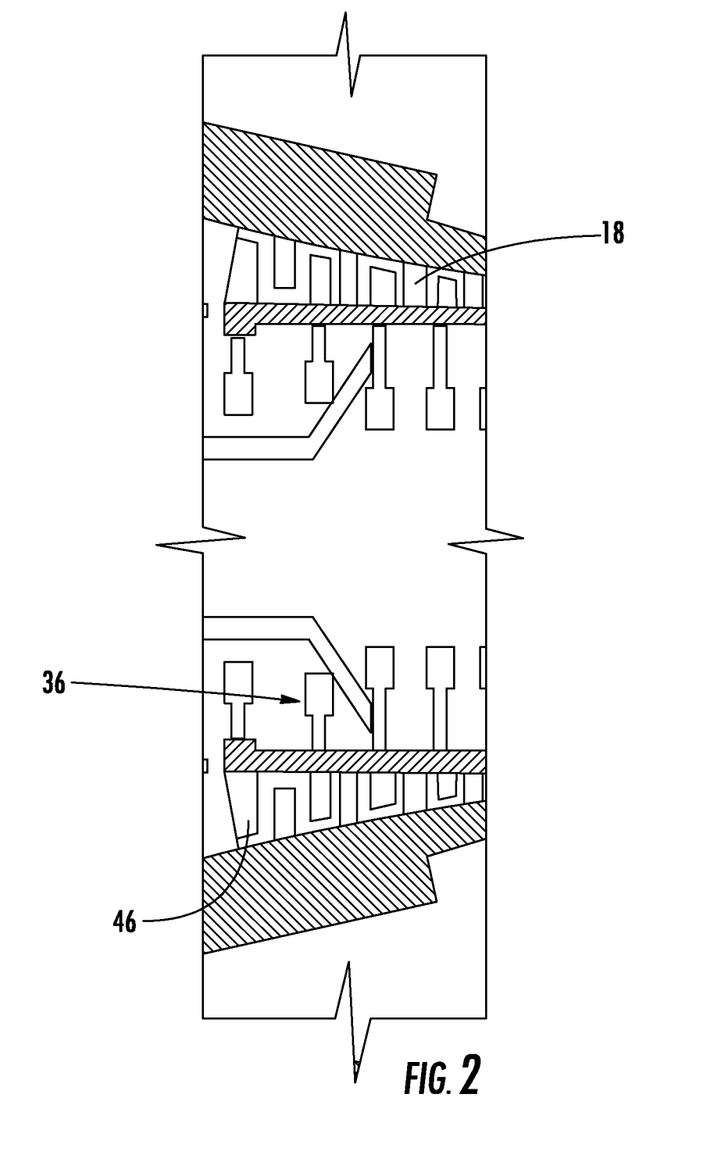
FIG. 2 is a radial cross-sectional schematic view of taken at region 2 of the gas turbine engine shown in FIG. 1.
Figure 3:
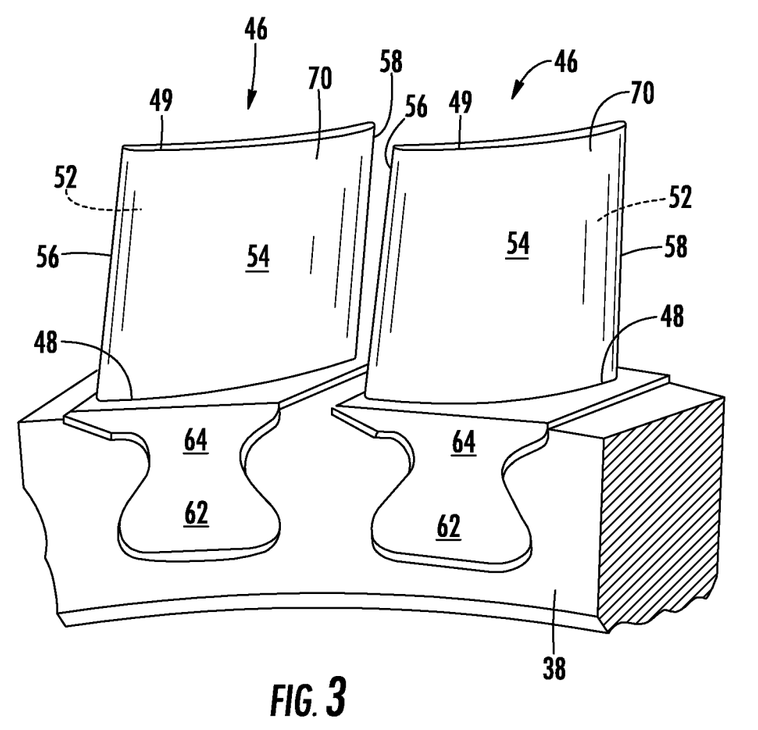
FIG. 3 is a perspective view of a section of the rotor shown in FIG. 2 at region 3 with airfoils.

Referring now to FIGS. 2 and 3, the rotor 36 includes a disk 38, and an array of compressor blades 46 extends from the disk 38. The rotor 36 is concentric to the axis 11 and the inner shaft 28. In FIG. 3, two of the compressor blades 46 are shown. Each compressor blade 46 extends from a root 48 to a blade tip 49 and is considered herein as stationary relative to the engine 10.

The compressor blades 46 each include an airfoil 70. The airfoil 70 includes a concave pressure side 52 joined to a convex suction side 54 at a leading edge 56 and a trailing edge 58. The root 48 of each airfoil 70 connects to a dovetail 62 through a shank 64.

Figure 4:
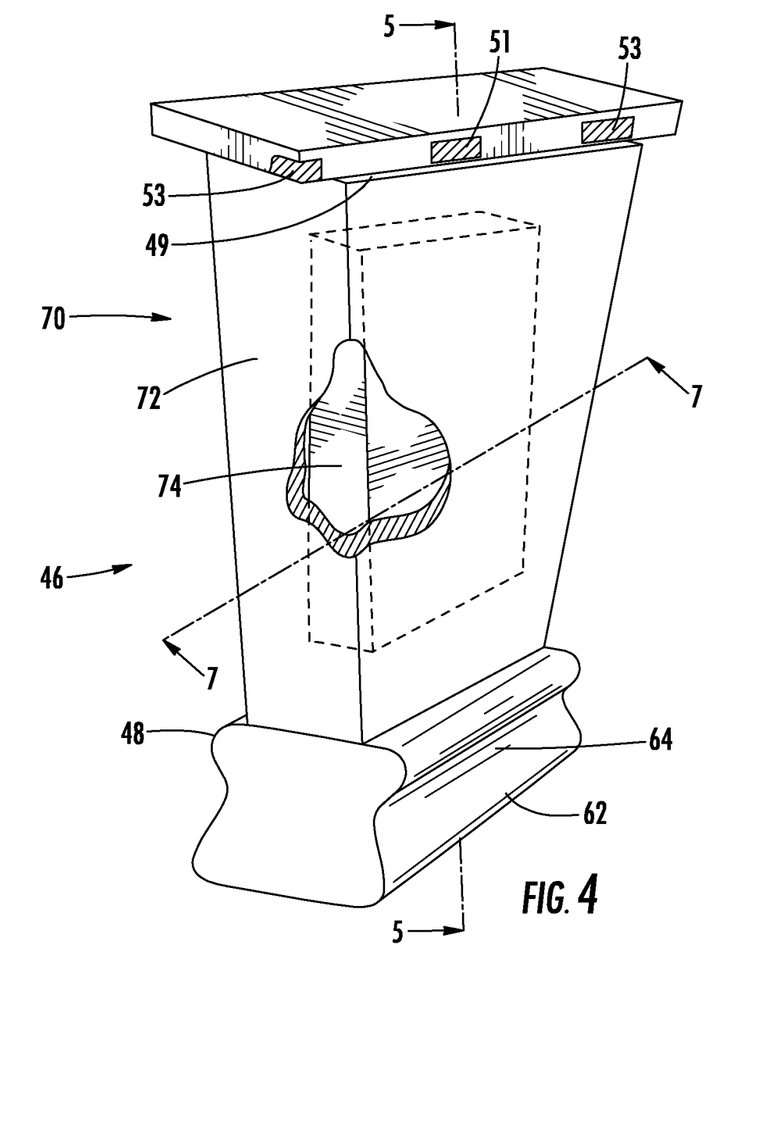
FIG. 4 is a perspective view with a partial cutaway of an airfoil of the engine shown in FIG. 1.
Figure 5:
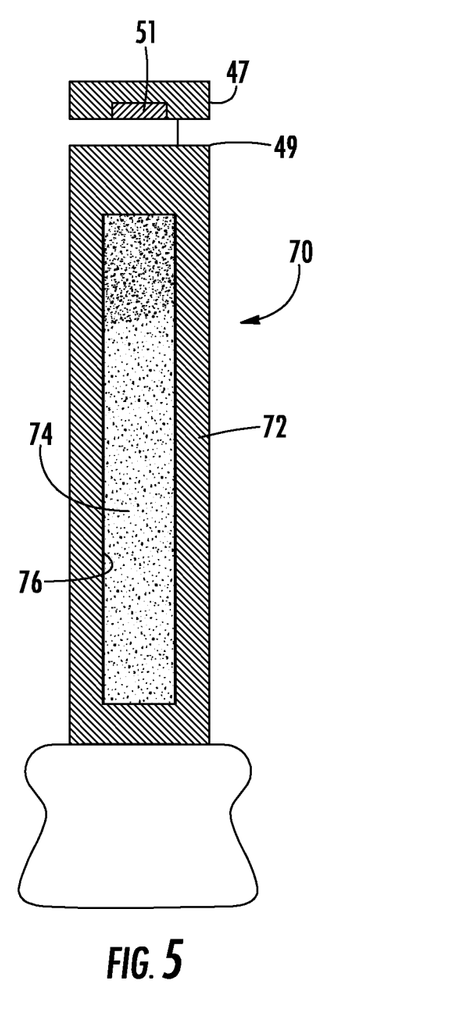
FIG. 5 is a schematic sectional view taken along line 5-5 of FIG. 4, with the airfoil in a first condition.

The airfoil 70 includes a body 72 and a filler 74. As shown in FIGS. 4 and 5, the filler 74 is contained within a cavity 76 defined within the body 72. According to the first embodiment, the filler 74 is a first portion of the airfoil 70 and is formed of a first material. The body 72 is a second portion of the airfoil 70 and is formed of a second material. The first material has a first stiffness when a first amount of an outside stimulus is applied to the first material and a second stiffness when a second amount of an outside stimulus is applied to the first material.

The disk 38 and components of the compressor blades 46 other than the filler 74 may be constructed from any material capable of withstanding the anticipated stresses and environmental conditions in operation. Non-limiting examples of known suitable alloys include nickel- and cobalt-based alloys. Other suitable materials include composite materials, such as carbon reinforcing fibers in an epoxy matrix, with or without metallic shielding.

Figure 6:
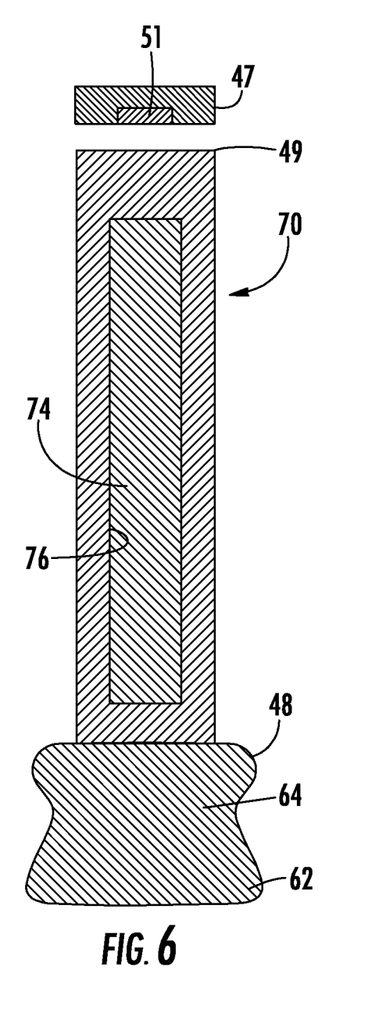
FIG. 6 is a schematic sectional view taken along line 5-5 of FIG. 4, with the airfoil in a second condition.
Figure 7:
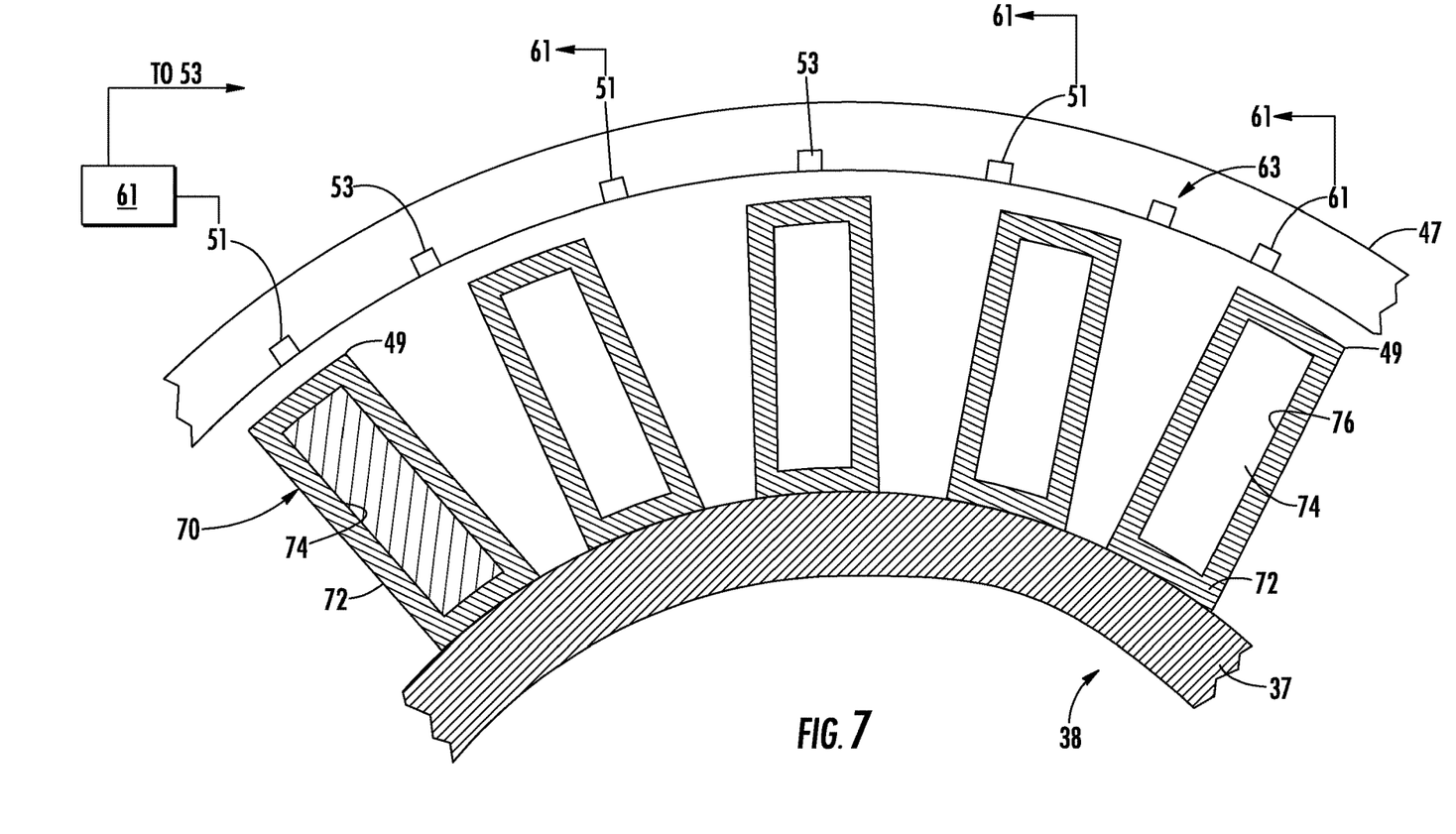
FIG. 7 is a schematic sectional view of a rotor showing airfoils of the engine of FIG. 1.

In general, the volume of the cavity 76 defined in the body 72 would be sufficient to contain the filler 74 in all possible states. Accordingly the filler 74 is formed of a material that has a low coefficient of thermal expansion and undergoes substantially no change in volume associated with a change in state between solid and liquid. As shown in FIGS. 4-6, there is no expansion space provided within the cavity 76. It is desirable to have little to no expansion volume, such as an airspace between the filler 74 and the cavity 76 so that in the activated state, solid phase, shown in FIG. 5 the filler 74 behaves as an extension of the body 72.

The location within the associated airfoil 70, the shape, and the volume of each of the cavities 72 are identical for all of the blades 46 of the rotor 36. Optionally, a portion of the cavity 76 can be defined by a thin wall that acts as a diaphragm and moves in response to changes in size of the filler 74 such that no air space is present within the cavity 72. Optionally, the cavity 76 can be fluidly connected to an expansion chamber.

The filler 74 is constructed from a material capable of changing its physical properties in response to applied electromagnetic energy. As used herein, the term "electromagnetic energy" refers to energy in any portion of the electromagnetic spectrum. One nonlimiting example of a suitable form of electromagnetic energy is a magnetic field. More specifically, the filler 74 is capable of changing its viscosity, phase, and/or stiffness in response to the application of electromagnetic energy. As one example, filler 74 can be constructed from a magnetorheological fluid ("MR"). As used herein, the term "magnetorheological fluid" refers to a material that contains ferromagnetic particles suspended in an oil. In a neutral state, the material is a liquid having a baseline viscosity. When subjected to a magnetic field, the viscosity of the material increases. As the strength of the magnetic field is increased, the viscosity of the material increases further. When the magnetic field is sufficiently strong, the material takes on the properties of an elastomeric solid.

Referring now to FIG. 5, the filler 74 is a liquid in a first configuration where the applied electromagnetic field (if any) is not sufficiently strong for filler 74 to be a solid. As shown in FIG. 6, the filler 74 is shown as a solid. In a second configuration, the airfoil 70 is within a magnetic field. The filler 74 is configured such that, in combination with the predetermined strength of the magnetic field, the filler 74 is in a solid state.

The blade tips 49 of the compressor blades 46 are spaced-apart from a ring shroud 47. The ring shroud 47 is supported by the casing 12. As shown in FIGS. 4-7, a plurality of electromagnets 53 are positioned within the ring shroud 47. The electromagnets 53. The electromagnets are operable to generate a magnetic field of a predetermined range. A plurality of sensors 51 may also be positioned within the ring shroud 47. The sensors 51 are configured to determine a parameter such as the clearance of the tips 49 and the shroud 47 that is dependent on a characteristic such as vibration. Tip timing sensors can be used to detect vibrations. For stationary hardware, piezoelectrics and strain gauges can be used to detect vibrations. Hardware such as sensors 51, electromagnets 53, electrical conductors, and so forth would not be mounted in any rotating parts but instead would be mounted in a shroud or other stationary part, close enough for the magnetic field to affect the filler 74. The sensors 51 are connected to an electronic controller 61 that is configured and/or programmed to operate the electromagnets 53 so as to produce a desired electromagnetic field strength in response to the values sensed by the sensors 51. The controller 61 may be programmed to operate the electromagnets 53 in unison or individually, and the field strength of the electromagnets 53 may be constant or time-varying.

The present technology can be better understood by a description of the operation thereof. The airfoil 70 is positioned within the engine 10 such that it is exposed to aerodynamic forces and mechanical forces that vary at a forcing frequency. As used herein, the term "forcing frequency" refers to frequencies that can cause sympathetic vibrations to occur in the airfoil 70. When a natural frequency and a forcing frequency are similar, resulting vibrations in the airfoil 70 have the greatest amplitude and can cause the most damage. The forcing frequency can come from different sources. For example, a rotating airfoil row might have rows of stationary airfoils upstream and downstream. If, for example the upstream row contains 77 individual stationary airfoils, then each rotating airfoil would experience 77 pulses per revolution (77/rev excitation) as it passes through the wakes the upstream airfoils. This is referred to as a "synchronous" vibration. Other vibrations occur when the component properties interact with a constant flow field (similar to an aircraft control surface or a roadside sign vibrating in high winds). These are referred to as "non-synchronous" vibrations. It should be appreciated that the effects of rotating hardware can result in vibrations in nonrotating hardware and the technology disclosed herein is therefore applicable to nonrotating hardware.

In one example, the engine 10 is in a baseline state, the filler 74 is liquid and does not contribute significantly to the stiffness of the airfoil 70 and the airfoil 70 has a first natural frequency that is sufficiently different from the forcing frequency that damaging vibrations are unlikely to occur in the airfoil 70. As the state of engine 10 changes, for example by an increase in rotor speed or change in airflow velocity, the forcing frequency can approach one of the natural frequencies of the airfoil 70. For the purposes of explanation, the first natural frequency of the airfoil 70 will be used as an example.

The disclosed technology provides for changing the first natural frequency of the airfoil 70 from a baseline frequency to a second, different frequency to avoid conditions where the natural frequency of the airfoil 70 is similar or equal to the forcing frequency. This change may be effected by exposing the filler 74 to a magnetic field by activating at least one of the electromagnets 53. This will have the effect of increasing the viscosity of filler 74 and/or changing the filler 74 to a solid. In either case this would result in increasing the stiffness of the airfoil 70, thereby changing the frequency response of the airfoil 70.

As conditions of the engine 10 continue to change, the forcing frequency can approach the second frequency. The natural frequency of the airfoil 70 may be changed from the second frequency to the baseline frequency to skip the forcing frequency by removing or reducing the strength of the magnetic field, thereby changing the filler 74 from a solid to a liquid and/or reducing the viscosity of the filler 74 if it is already liquid. This will have the effect of decreasing the stiffness of the component airfoil 70; and changing the frequency response of the airfoil 70.

It should be appreciated that the electromagnetic energy, such as magnetic fields, can be chosen such that additional conditions of stiffness of the airfoil 70 are determined. As a result, additional natural frequencies for the airfoil 70 can be determined.

In accordance with an alternative method, the shape of the airfoil 70 can be controlled. In use, the airfoil 70 is subject to numerous forces which deflect or deform it from a from a cold, baseline state. These forces include aerodynamic forces, thermal forces, and mechanical forces. The filler 74 is provided within the airfoil 70 and activated in order to increase the stiffness of the airfoil 70 in order to reduce the effect of these forces. Thus, the "hot" shape of the airfoil 70 could be maintained closer to a predetermined efficient design than is possible for a passive airfoil. It should be appreciated that another application of changing the shape of the airfoil 70 is to reduce the effect of rubs between blade tip 49 and the ring shroud 47. Additionally, controlling the hot shape of the airfoil allows for the angle of attack to be controlled and provides an effective input for controlling instabilities such as flutter and nonsynchronous vibrations.

Figure 8:
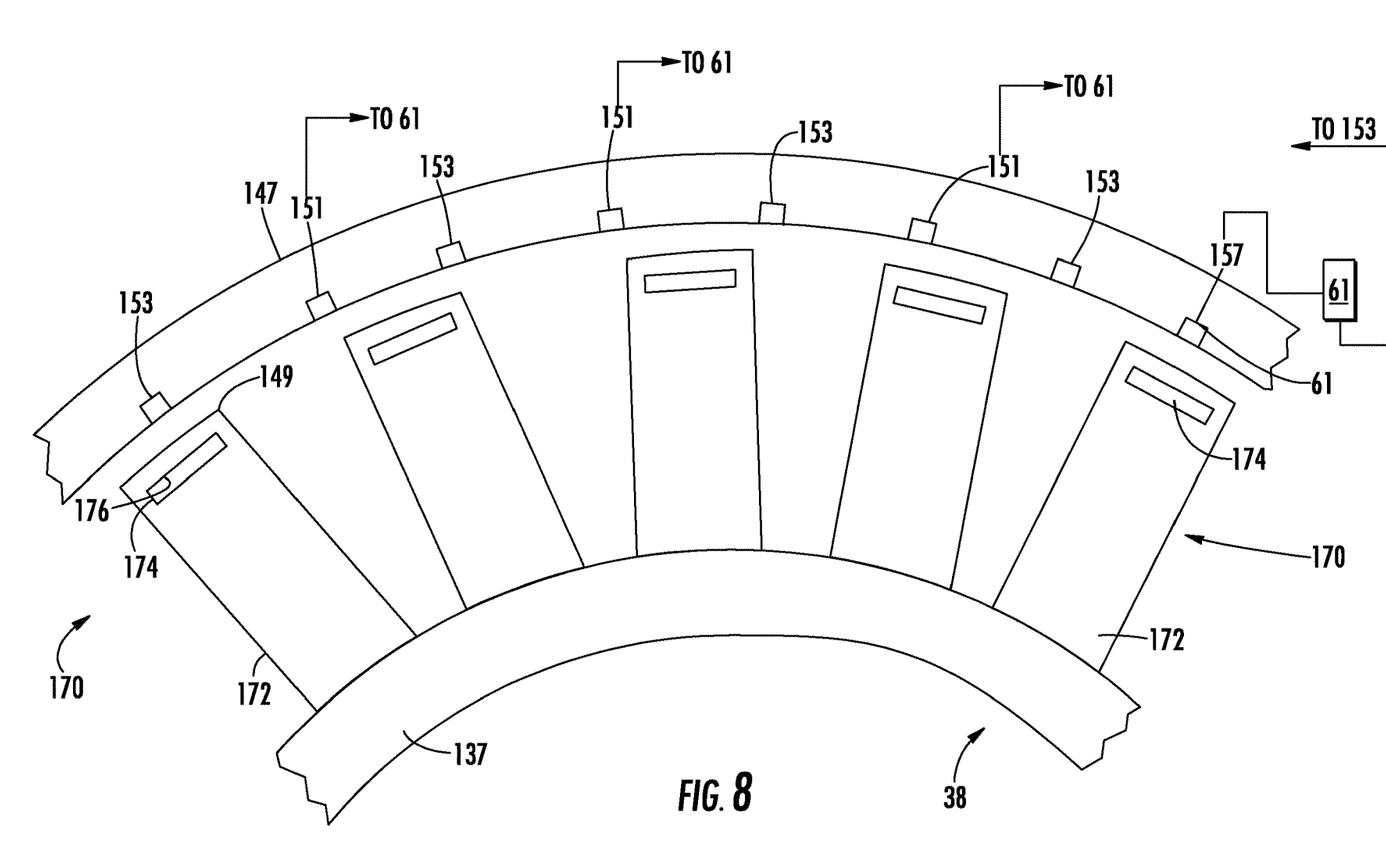
FIG. 8 is a schematic sectional view of a rotor showing airfoils according to another embodiment.

Referring now to FIG. 8, there is shown an alternative embodiment that includes an airfoil 170 that is configured to also facilitate stiffening of the airfoil to respond in predetermined ways to outside forces. Reference numbers in the 100 series refer to components that are similar to and can be understood from components described above associated with similar reference numbers in the 00 series described above.

A plurality of airfoils 170 extend to tips 149 from a hub 137 of a disk 138. The airfoils 170 each include a body 172 that defines a cavity 176 positioned near the tip 149 of the airfoil 170. A filler 174 is contained within the cavity 176. A ring shroud 147 is positioned such that it clears the tips 149. A plurality of electromagnets 153 and sensors 151 are positioned with in the ring shroud 147. When the filler 174 is activated to a solid state by exposure to a magnetic field generated by the electromagnets 153, the tip 149 of the airfoil 170 is stiffened.

Figure 9:
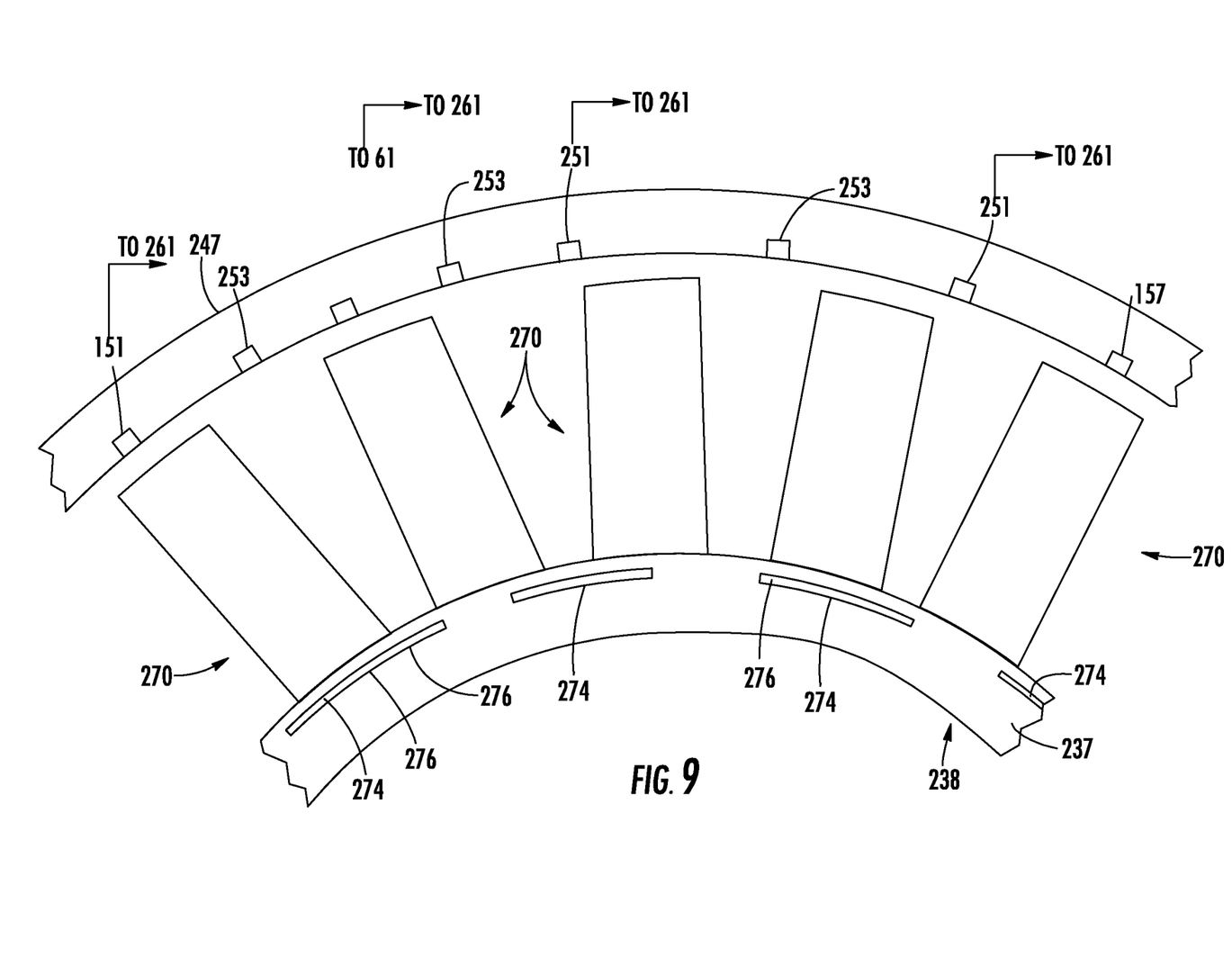
FIG. 9 is a schematic sectional view of a rotor showing airfoils according to yet another embodiment.

Referring now to FIG. 9, there is shown an alternative embodiment that includes an airfoil 270 of an engine 210 that is configured to facilitate tuning or intentional mistuning of the airfoil to respond in predetermined ways to outside forces. Reference numbers in the 200 series refer to components that are similar to and can be understood from components described above associated with similar reference numbers in the 00 series described above.

A plurality of airfoils 270 extend to tips 249 from a hub 237 of a disk 238. A ring shroud 247 is positioned such that it clears the tips 249. A plurality of electromagnets 253 and sensors 251 are positioned with in the ring shroud 247. The airfoils 270 each include a body 272. A plurality of cavities 276 are defined with the hub 237 of the disk 238. A filler 274 is contained within each cavity 276. By changing the MR fluid of the fillers 274 between a solid and a liquid, the disk 238 can be tuned or mistuned to perform optimally at strategic times. For example the engine 210 can be mistuned to reduce flutter vibrations.

This alternative embodiment can be better understood by a description of the operation thereof. There is a method provided to manipulate the state of the filler 274 to address vibrations by "mis-tuning" a component. A disk having all the blades with matching natural frequencies is desirable for control of synchronous vibrations, but is undesirable for control of nonsynchronous vibrations. Positioning fillers 274 in discrete locations within the rotor disk 237.

Figure 10:
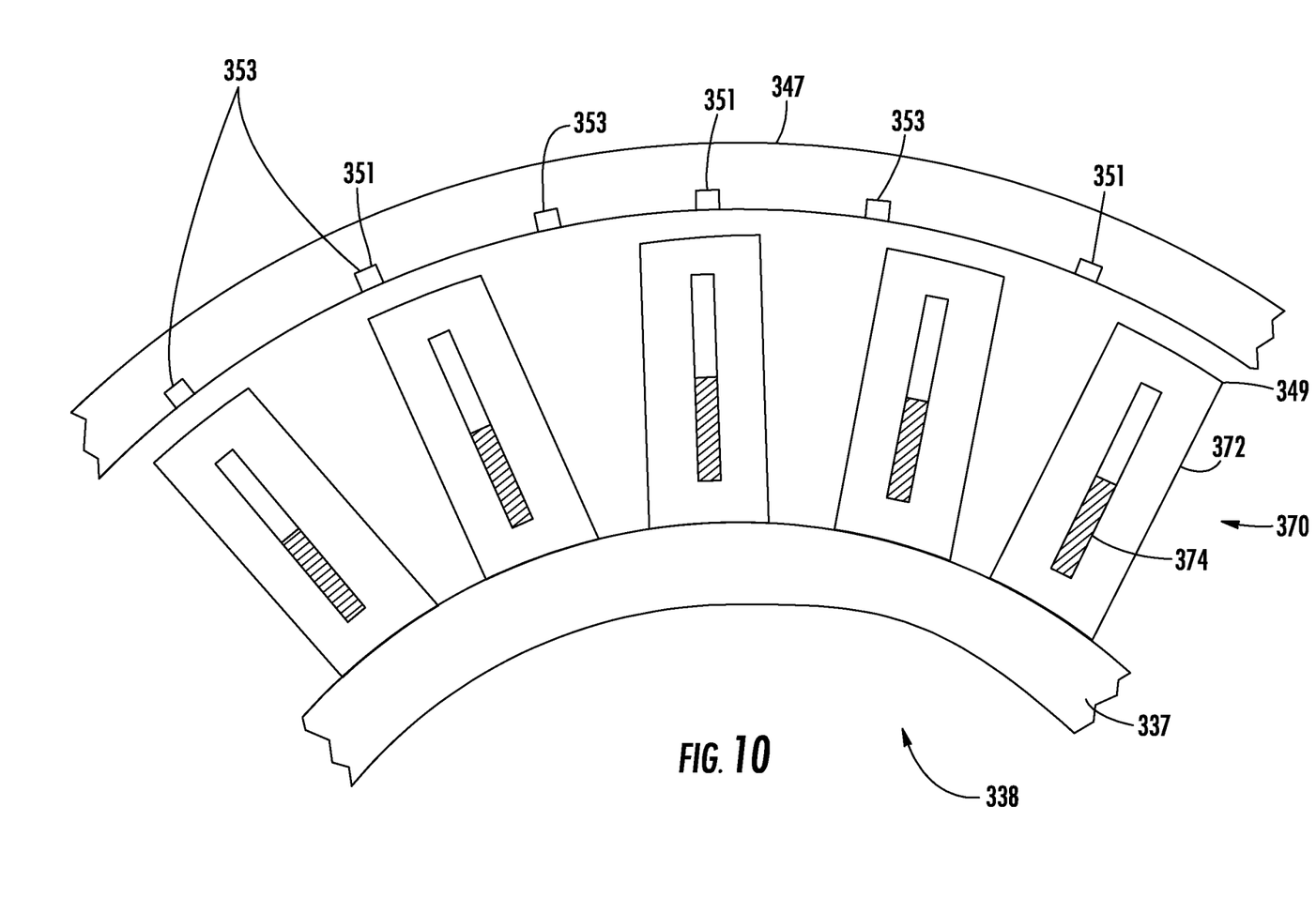
FIG. 10 is a schematic sectional view of a rotor showing airfoils according to yet another embodiment showing a first condition.
Figure 11:
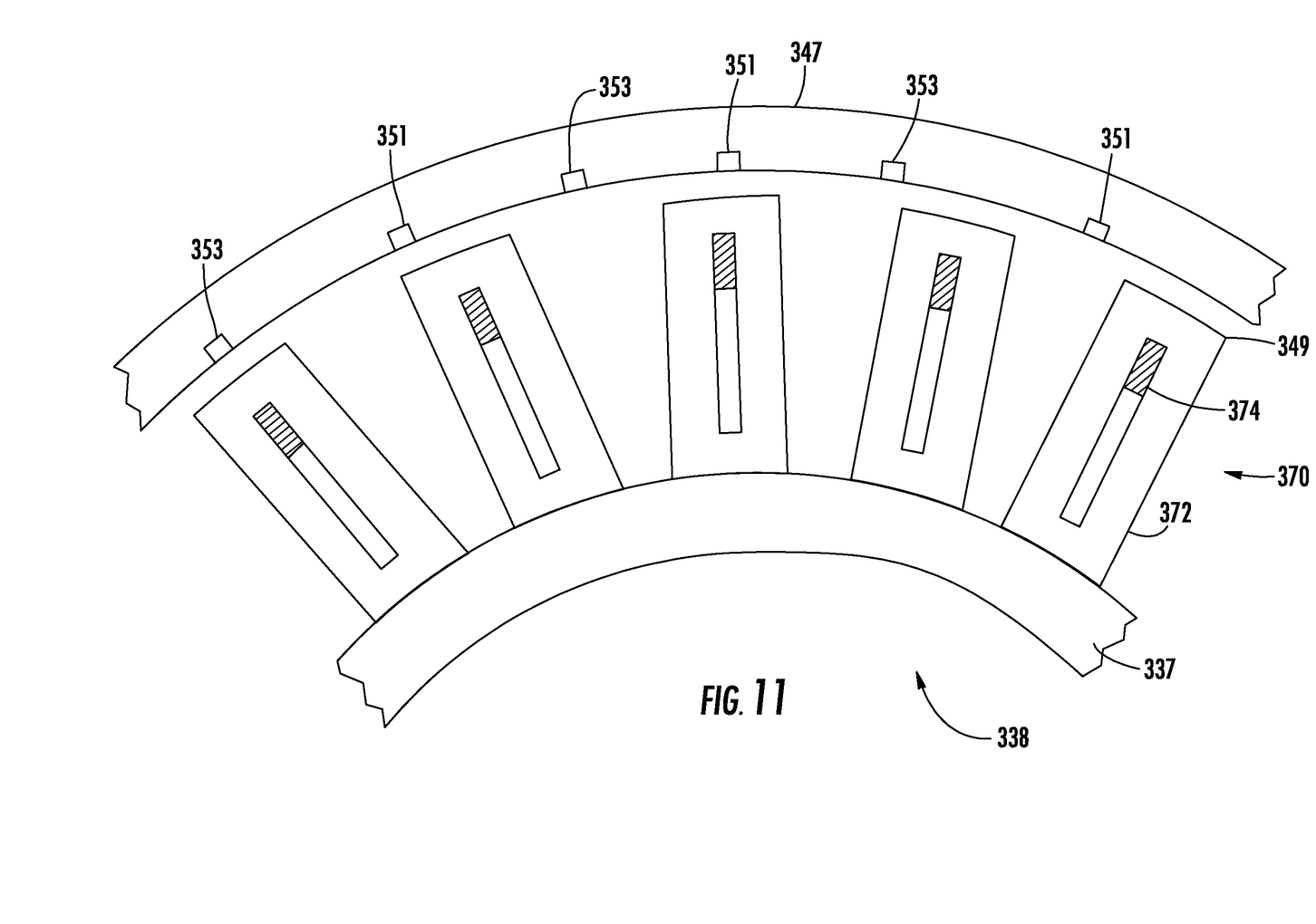
FIG. 11 is a schematic sectional view of the rotor of FIG. 10 showing a second condition.

Referring now to FIGS. 10-11, there is shown an alternative embodiment that includes an airfoil 370 that is configured to facilitate tuning of the airfoil 370 by movement of the filler 374 and its associated mass outwardly away from a hub 337 in response to centrifugal forces. Reference numbers in the 300 series refer to components that are similar to and can be understood from components described above associated with similar reference numbers in the 00 series described above.

Figure 12:
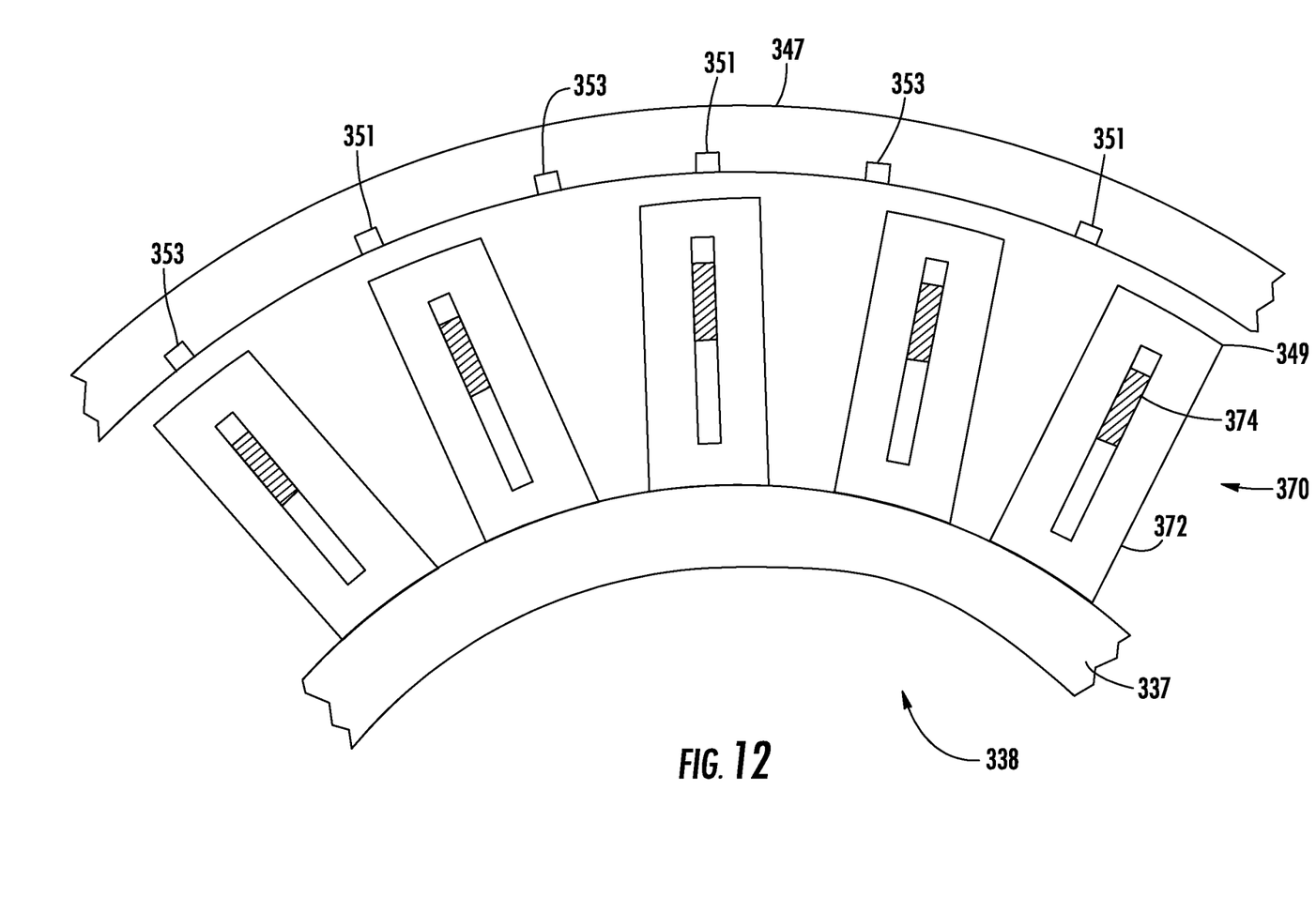
FIG. 12 is a schematic sectional view of the rotor of FIG. 10 showing a third condition.

A plurality of airfoils 370 extend to tips 349 from the hub 337 of a disk 338. A ring shroud 347 is positioned such that it clears the tips 349. A plurality of electromagnets 353 and sensors 351 are positioned with in the ring shroud 347. The airfoils 370 each include a body 372. A plurality of cavities 376 are defined with the hub 337 of the disk 338. Each of the cavities 376 extend from one end that is nearer the tip 349 to an opposite end that is nearer the hub 337. A filler 374 is contained within each cavity 376 and the filler 374 is smaller than the cavity 376 such that the filler 374 can move between a first position (shown in FIG. 10) and a second position (shown in FIG. 11). By changing the MR fluid of the fillers 374 between a solid and a liquid, the disk 338 can be tuned or mistuned by relocating the filler 374 from the first position to the second position. When the filler 374 is in liquid form, it can move in response to a dominant force of either centrifugal force or gravity. Such a transition outward, in response to centrifugal force is shown in FIG. 12. Selective application of electromagnets 353 can be utilized to maintain a filler 374 in a solid shape to remain in the first or second position as desired. In this manner, the disk 338 can be self-balanced or frequency tuned.

Figure 13:
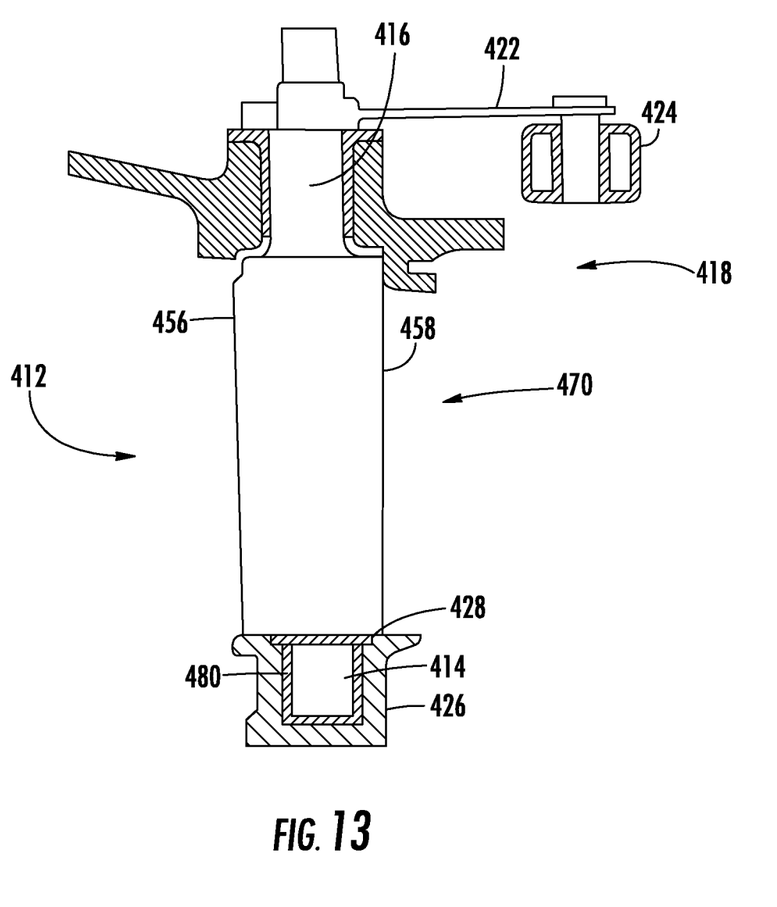
FIG. 13 is a schematic view of a variable stator vane that includes an airfoil which is mounted utilizing a bushing that is configured to change physical properties when exposed to an outside stimulus.

The techniques described above may also be applied to non-rotating airfoils. For example, FIG. 13 illustrates an exemplary variable stator vane 412. A compressor such as compressor 18 shown in FIG. 1 may be equipped with one or more stages of such variable stator vanes 412. Each of the vanes 412 includes an airfoil 470 that includes a leading edge 456 and a trailing edge 458. The airfoil 470 extends between an inner trunnion 414 and an outer trunnion 416. The outer trunnion 416 is configured to be rotatably engaged with an outer casing 419 of the compressor 418 and extends to be connected to an arm 422. The arm 422 is connected to an actuator 424. The actuator 424 can be an actuator ring or other apparatus configured to move the arm 422 such that the associated vane 412 is moved in response.

The inner trunnion 414 is positioned within a transformable bushing 480 that is received in an inner ring 426 and retained therein by a seal 428. The transformable bushing 480 is formed of a magnetorheological fluid as described above. In operation the stiffness of the bushing 480 can be controlled by exposure to an outside stimulus such as a magnetic field as described above. By controlling the stiffness of the bushing 480, the vane 412 can be moved between a first condition where the bushing 480 is a liquid and a second condition where the bushing 480 is a solid. When the bushing 480 is a liquid, the inner trunnion 414 is free and there is less resistance at inner trunnion 414 and thus less resistance to movement, i.e., less stiffness, of the vane 412. When the bushing 480 is a solid, the inner trunnion is not free and there is more resistance at inner trunnion 414 and thus more resistance to movement, i.e., more stiffness, of the vane 412.

The technology disclosed herein provides an airfoil that includes a material that has physical properties that can be changed during operation. In the illustrated embodiment, a portion of a component such as an airfoil is formed of a magneto rheological material. When this MR material is exposed to a magnetic field its viscosity can be increased to predetermined level. The material can be a solid or a liquid. By manipulating the MR material, several characteristics of the airfoil can be adjusted between predetermined positions. Such characteristics include but are not limited to: stiffness, mass distribution, and shape.

The commercial and technical advantages of the disclosed technology relate to the ability of the described airfoil to skip high resonant responses by altering the stiffness of the airfoil. The natural frequency of the airfoil can be changed to avoid situations where the natural frequency might be similar to a forcing frequency. Further, the natural frequency can be set such that the airfoils of a rotor are mistuned to reduce susceptibility to flutter and nonsynchronous vibration control. By skipping forcing frequencies and mistuning, aerodynamic and mechanical environment inefficiencies and damage to the engine can be reduced. Thus the present technology provides an engine that operates more efficiently, can be manufactured more cheaply because tunable airfoils do not require as much material strength because high resonance situations can be avoided, and will cost less for maintenance due to less damage related to vibration.

The foregoing has described an airfoil that is configured to actively control vibration by changing stiffness of the airfoil utilizing outside stimuli to change physical properties of at least one portion of the airfoil. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An apparatus for an aircraft engine that is configured for actively adjusting physical characteristics of an airfoil, the apparatus comprising:
   an airfoil that includes a body, a closed cavity defined in the body, and a filler contained in the cavity, the filler partially filling the cavity to allow the filler to move within the cavity from a first position to a second position when in a first state;
   a source for electromagnetic energy positioned in a portion of the engine and configured to generate electromagnetic energy having a predetermined range which encompasses the airfoil;
   a physical property of the filler is configured to change between the first state in the absence of electromagnetic energy and a second state in the presence of electromagnetic energy; and
   wherein the airfoil has a first airfoil characteristic when the filler is in the first state and the airfoil has a second airfoil characteristic when the filler is in the second state.

2. The apparatus according to claim 1, wherein the source for electromagnetic energy is mounted in a static portion of the engine.

3. The apparatus according to claim 2, wherein the airfoil is configured to move relative to the source.

4. The apparatus according to claim 1, wherein the physical property of the filler that is configured to change is viscosity.

5. The apparatus according to claim 4, wherein the airfoil characteristic that changes when the physical property of the filler changes is stiffness.

6. The apparatus according to claim 4, wherein the airfoil characteristic that changes when the physical property of the filler changes is a natural harmonic frequency.

7. The apparatus according to claim 4, wherein the airfoil characteristic that changes when the physical property of the filler changes is shape.

8. The apparatus according to claim 4, wherein the airfoil characteristic that changes when the physical property of the filler changes is size.

9. The apparatus according to claim 1, wherein the filler is formed of a magneto rheological material.

10. A method for changing a physical characteristic of an aircraft engine component utilizing an electromagnetic field, the method comprising the steps of:
    generating an electromagnetic field; and
    exposing a filler contained in a closed cavity defined in a part of an aircraft engine component to the electromagnetic field, the filler partially filling the closed cavity to allow the filler to move within the cavity from a first position to a second position when in a first state; and
    causing a physical property of the filler to change between the first state and a second state.

11. The method according to claim 10, wherein the step of causing the physical property of the filler to change is preceded by step of providing the electromagnetic field at a predetermined level.

12. The method according to claim 10, wherein the first state is liquid and the second state is solid.

13. The method according to claim 10, wherein the physical property of the filler is its viscosity.

14. The method according to claim 10, further comprising the step of changing a physical characteristic of the aircraft engine component.

15. The method according to claim 14, wherein the airfoil characteristic that changes when the physical property of the filler changes is stiffness.

16. The method according to claim 14, wherein the airfoil characteristic that changes when the physical property of the filler changes is a natural harmonic frequency.

17. The method according to claim 14, wherein the airfoil characteristic that changes when the physical property of the filler changes is shape.

18. The method according to claim 14, wherein the airfoil characteristic that changes when the physical property of the filler changes is size.

19. An apparatus for an aircraft engine that is configured for actively adjusting physical characteristics of an airfoil, the apparatus comprising:
- an airfoil that includes a body, a closed cavity defined in the body, a thin wall disposed in the closed cavity, and a filler contained in the cavity, wherein the thin wall moves in response to changes of the filler as it changes between a first state and a second state such that no air space is present in the cavity;
- a source for electromagnetic energy positioned in a portion of the engine and configured to generate electromagnetic energy having a predetermined range which encompasses the airfoil;
- a physical property of the filler is configured to change between the first state in the absence of electromagnetic energy and the second state in the presence of electromagnetic energy; and wherein the airfoil has a first airfoil characteristic when the filler is in the first state and the airfoil has a second airfoil characteristic when the filler is in the second state.

20. A method for changing a physical characteristic of an aircraft engine component utilizing an electromagnetic field, the method comprising the steps of:
- generating an electromagnetic field; and
- exposing a filler contained in a closed cavity defined in a part of an aircraft engine component to the electromagnetic field, the closed cavity having a thin wall defined therein such that the thin wall moves in response to changes of the filler as it changes between a first state and a second state such that no air space is present in the cavity; and
- causing a physical property of the filler to change between the first state and the second state.

21. The method according to claim 20, further comprising the step of changing a physical characteristic of the aircraft engine component.

22. The method according to claim 21, wherein the airfoil characteristic that changes when the physical property of the filler changes is stiffness.

23. The method according to claim 21, wherein the airfoil characteristic that changes when the physical property of the filler changes is a natural harmonic frequency.

24. The method according to claim 21, wherein the airfoil characteristic that changes when the physical property of the filler changes is shape.

25. The method according to claim 21, wherein the airfoil characteristic that changes when the physical property of the filler changes is size.

* * * * *